US005470942A

United States Patent [19]

Alexander et al.

[11] Patent Number: 5,470,942
[45] Date of Patent: Nov. 28, 1995

[54] PREPARATION OF ANHYDROPOLYAMINO ACIDS

[75] Inventors: Gregory C. Alexander, University City; Mark E. Jason, Chesterfield; Dennis J. Kalota, Fenton, all of Mo.

[73] Assignee: Monsanto Company, St. Louis, Mo.

[21] Appl. No.: 390,202

[22] Filed: Feb. 16, 1995

[51] Int. Cl.$^6$ .................................................... C08G 69/10
[52] U.S. Cl. ........................ 528/328; 210/696; 210/697; 210/698; 210/699; 210/700; 525/421; 525/422; 525/435; 528/332; 528/345; 528/363
[58] Field of Search ................................ 525/421, 422, 525/435; 528/328, 332, 345, 363; 210/696, 697, 698, 699, 700, 701; 252/180, 181

[56] References Cited

U.S. PATENT DOCUMENTS

| | | | |
|---|---|---|---|
| 3,846,380 | 11/1974 | Fujimoto et al. | 528/328 |
| 4,333,844 | 6/1982 | Duggleby et al. | 252/97 |
| 4,363,797 | 12/1982 | Jacquet et al. | 424/70 |
| 4,407,722 | 10/1983 | Davies et al. | 252/91 |
| 4,428,749 | 1/1984 | Morris | 252/90 |
| 4,971,724 | 11/1990 | Kalota et al. | 252/390 |
| 5,057,597 | 10/1991 | Koskan | 528/328 |
| 5,221,733 | 6/1993 | Koskan et al. | 530/333 |
| 5,284,512 | 2/1994 | Koskan et al. | 106/416 |
| 5,288,783 | 2/1994 | Wood | 525/418 |
| 5,292,864 | 3/1994 | Wood et al. | 528/490 |
| 5,315,010 | 5/1994 | Koskan et al. | 548/520 |
| 5,319,145 | 6/1994 | Paik et al. | 528/328 |

FOREIGN PATENT DOCUMENTS

| | | |
|---|---|---|
| 14775/92 | 4/1991 | Australia . |
| 0567881A2 | 4/1993 | European Pat. Off. . |

OTHER PUBLICATIONS

"Temperature Effect on the Molecular Weight and the Optical Purity of Anhydropolyaspartic Acid Prepared by Thermal Polycondensation", *Bulletin of the Chemical Society of Japan*, vol. 51(5), 1555–1556 (1978), Kokufuta et al.

*J.O.C.S.*, vol. 26, 1084–1091 (1961), J. Kovacs et al.

"Water-Soluble Polyamides as Potential Drug Carriers", *Die Angewandte Makronmolekulare Chemie* 192 35–50 (1991), Neuse et al.

National Council on Research and Development NRCD 8–76, Seawater Desalination 150–157 (1977), Sarig et al.

*Primary Examiner*—Shelley Dodsoo
*Attorney, Agent, or Firm*—R. C. Loyer

[57] ABSTRACT

There is disclosed a process for preparing polyaspartic acid by thermal condensation of L-aspartic acid in a novel catalyst which shortens the reaction time and increases the molecular weight of the polymer. The novel catalyst is a catalytically effective methylenephosphonic acid. Typical catalysts are 1-hydroxyethylidene-1,1-diphosphonic acid and aminotris(methylenephosphonic acid). The methylenephosphonic acid is blended with the amino acid in a molar ratio of amino acid to catalyst in the range of from about 1:1 to 40:1.

13 Claims, No Drawings

PREPARATION OF ANHYDROPOLYAMINO ACIDS

This invention relates to a process for preparing anhydropolyamino acids and the hydrolysis thereof to form polyamino acids. More particularly this invention relates to novel catalytic processes for preparing polysuccinimide with reduced reaction time.

BACKGROUND OF THE INVENTION

The thermal condensation of alpha amino acids to form polymers with loss of water has been known for many years. Early interest in such processes related to theories for formation of prebiotic polypeptides. For the purpose of testing such theories laboratory experiments used powdered L-aspartic acid, usually packed in the bottom of a flask which was then heated below the melting point of the acid. Such reactions were slow and took place over many hours. One such example is reported by Kokufuta et al. in Bulletin of the Chemical Society of Japan Vol. 51 (5) 1555–1556 (1978) "Temperature Effect on the Molecular Weight and the Optical Purity of Anhydropolyaspartic Acid Prepared by Thermal Polycondensation." The structure of anhydropolyaspartic acid has been thoroughly investigated such as by J. Kovacs et al. in J.O.C.S. Vol. 26 1084–1091 (1961).

In recent years many utilities have been suggested for polyamino acid. Such polyamides have been suggested as potential drug carriers by Neuse et al. in Die Angewandte Makronmolekulare Chemie 192 35–50 (1991) "Water-soluble polyamides as potential drug carriers." They have also been tested as scale inhibitors with respect to natural sea water and calcium sulfate in particular by Sarig et al. as reported by the National Council on Research and Development (NRCD 8–76, Seawater Desalination 150–157 (1977). Polyaspartic acid has been well known for its ability to disperse solid particles in detergent formulations, having been mentioned as a dispersant in numerous patents, a few of which are U.S. Pat. Nos. 4,363,497; 4,333,844; 4,407,722 and 4,428,749. As a departure from the usual manner of utilizing polyaspartic acid in detergent formulations it is reported in Australian Patent A-14775/92 that the polyimide is added to the wash liquor which, upon hydrolysis in situ, is converted into a biodegradable polypeptide builder. Also, as described in U.S. Pat. No. 4,971,724 to Kalota et al., it has been discovered that compositions comprising polyamino acids such as aspartic acid, when ionized at alkaline pH, effectively inhibit corrosion of ferrous metals in the presence of aqueous medium. Various derivatives of polyamino acids have also been made wherein attributes have been supplied by groups attached to reactive sites on the molecule. One such example is disclosed in U.S. Pat. No. 3,846,380 to Fujimoto et al.

With the increasing importance of polyaspartic acid in the detergent industry, the efficient production of large quantities with low color has become important. One method known to provide low colored polyaspartic acid is one in which phosphoric acid is employed as a catalyst. Although the color of the product is improved with phosphoric acid catalyst, such catalyst must be removed from the product before use. Furthermore, the particulate L-aspartic acid undergoes phases during the reaction in which it becomes tacky and difficult to handle in large industrial reactors. There is therefore needed a more convenient catalyst which not only speeds the reaction thereby shortening reaction time and improve color, but also provide a more easily handled reaction mass and eliminate the need for removal of the catalyst from the product.

BRIEF DESCRIPTION OF THE INVENTION

In accordance with this invention there has been discovered a process for producing anhydropolyamino acids by thermal condensation of L-aspartic acid in high yield in shortened reaction time by including a catalytic amount of a methylene phosphonic acid. Methylenephosphonic acids are well known for their use in water treatment, particularly for the purposes of scale inhibition and sequestration. The preferred methylenephosphonic acid is 1-hydroxyethylidene-1,1-diphosphonic acid (HEDP). Other typical methylene phosphonic acids are aminotris(methylenephosphonic acid), ethylenediaminetetra(methylenephosphonic acid), hexamethylenediaminetetra(methylenephosphonic acid and diethylenetriaminepenta(methylenephosphonic acid) or mixtures thereof.

More specifically, the invention comprises a process for the production of anhydropolyamino acids in high yield by heating L-aspartic acid at a temperature in the range of above about 140° C. in the presence of a catalytically effective amount of a methylenephosphonic acid and then hydrolysing the resultant anhydropolyamino acid to polyaspartic acid in basic aqueous medium. Because the methylenephosphonic acids are useful as anti-scale agents and sequestrants in industrial water treatment and find uses in oil field chemicals and pharmaceuticals, their presence in anhydropolyaspartic acid or polyaspartic acid is not objectionable, particularly when the product is intended for use in aqueous solutions such as in the detergent industries.

DETAILED DESCRIPTION OF THE INVENTION

In accordance with this invention a catalytically active methylenephosphonic acid is thoroughly mixed with L-aspartic acid prior to the thermal condensation reaction wherein anyhydropolyamino acids are made. The most convenient means to provide thorough mixing is by dissolving both L-aspartic acid and the methylenephosphonic acid in water. The solution is then mixed and dried to recover dry, particulate L-aspartic acid having methylenephosphonic acid dispersed throughout the dry material. The dried material is then subjected to thermal condensation by any of the known means such as by subjecting the dried material to elevated temperature in an oven, tray driers (see U.S. Pat. Nos. 5,319,145 and 5,315,010) or a rotary drier (see U.S. Pat. No. 5,057,597), said patents being incorporated by reference, and the like. The resultant anhydropolyamino acid is then converted by alkaline hydrolysis to the polyamino acid salt.

Typically the minimum amount of methylenephosphonic acid included with L-aspartic acid for catalytic purposes is at least about 1 mole methylenephosphonic acid to 40 moles of L-aspartic acid up to a molar ratio of 1:1. Higher amounts can be employed in the event there is a utility for the end product in which it is desirable to have methylenephosphonic acid present in larger quantities. For example, HEDP may be included with L-aspartic acid up to a 1:1 mole ratio if desired.

Many methylenephosphonic acids are commercially available under the trade name Dequest® from Monsanto Company, St. Louis, Mo. They are widely used in water treatment applications for scale control, sequestration, industrial water treatment and bleach stabilization. These functions are not lost by the use of HEDP as a catalyst in the process of this invention. Therefore, when polyaspartic acid or anhydropolyaspartic acid is employed in the detergent industry there is no need to remove it from the product as it will function in an advantageous manner along with polyaspartic acid or salt thereof.

There is thus provided a convenient process for making an anhydropolyamino acid by continuously feeding an alpha amino acid reactant such as an L-aspartic acid to a reactor together with a catalytically effective amount of a methylenephosphonic acid.

DESCRIPTION OF THE PREFERRED EMBODIMENTS

In the following examples percentage figures are given in percent by weight unless otherwise noted. All molecular weight values are given as a weight average.

EXAMPLE 1

A blend comprising 85% L-aspartic acid (1.003 mole) and 15% HEDP (0.1141 mole) was prepared by dissolving the acids in water. After thorough mixing, the water was removed by means of a rotary evaporator. This dried blend was then placed in a pan and admitted to an oven held at a temperature in the range of 153° C. at the beginning and 199° C. at termination. The time the blend was held at that temperature range was about 3 hrs. 10 minutes. One hundred twenty-five grams of a light yellow polymer was recovered having a molecular weight of 12,499. Into 38.5 g of water was placed 17.22 g of the polymer and to this solution was added 4.32 g of 50% sodium hydroxide resulting in a clear solution of sodium polyaspartate.

EXAMPLE 2

To a beaker was added 133.09 g (1 mole) of L-aspartic acid and to this powder was added 38.83 g of HEDP in 60% water solution. The mixture was blended easily as it was a non-tacky and non-sticking, solid. The blend was transferred to a stainless steel pan and placed in an oven held at 228° C. beginning temperature. The blend was held in the oven for a period of 2.5 hrs. during which time the temperature fluctuated between 165° C. and 241° C. There was recovered 117.1 g of yellow colored polysuccinimide. The hydrolysed material had a molecular weight of 12,608.

EXAMPLE 3

The procedure of Example 2 was repeated except no HEDP was contained in the water blended with L-aspartic acid. The temperature of the oven was held to a range of from 226° C. to 243° C. and the acid was held in the oven for a period of 4.5 hrs. There was recovered 96.4 g of polysuccinimide which, when hydrolysed, indicated a molecular weight of 10,653.

EXAMPLE 4

To a beaker was added 133.31 (1,001 mole) of L-aspartic acid and 23.52 g (0.0787 mole) of aminotris(methylenephosphonic acid) available under the trade name Dequest 2000® and 52 g of water. The mixture was blended and then placed into a stainless steel pan and then heated in a forced draft oven held at a temperature in the range of from 211° C. to 242° C. The reaction was completed in 2 hrs. 17 minutes to provide polysuccinimide. The hydrolysed product had a molecular weight of 12,508.

EXAMPLE 5

The procedure of Example 4 was repeated except that water was substituted for the methylenephosphonic acid. The reaction required 3.5 hrs. for completion. The hydrolysed product had a molecular weight of 10,913.

EXAMPLE 6

To 1 mole of L-aspartic acid was added 18.79 g of a 60% solution of HEDP. The mixture was blended well and placed in a stainless steel pan. The pan was placed in an oven held to a temperature in the range of from 226 to 251 for a period of 1 hr. 40 minutes providing a complete reaction to form the polymer, polysuccinimide. The polymer was hydrolysed by placing 20.03 g into 64.43 g of water containing 50 g of 50% sodium hydroxide. The hydrolysed polymer had a molecular weight of 12,210.

EXAMPLE 7

The procedure of Example 6 was repeated except that only L-aspartic acid was placed in the pan. The reaction required 2 hrs. 20 minutes to complete and the hydrolysed polymer was found to have a molecular weight of 11,824.

EXAMPLE 8

The procedure of Example of Example 4 was repeated except that only 21.64 g of a 50% aqueous solution of aminotris(methylenephosphonic acid) was blended with 1 mole of L-aspartic acid. The blend was held in a stainless steel pan in an oven at a temperature in the range of from 224° C. to 247° C. for a period of 1 hr. 45 minutes to reach 99.7% completion. The hydrolysed polymer had a molecular weight of 12,915. A control sample of L-aspartic acid without catalyst was also polymerized but required 2 hrs. 45 minutes to complete. The molecular weight of the hydrolysed material was found to be 11,269.

Although the invention has been described in terms of specific embodiments which are set forth in considerable detail, it should be understood that this description is by way of illustration only and that the invention is not necessarily limited thereto since alternative embodiments and operating techniques will become apparent to those skilled in the art in view of the disclosure. Accordingly, modifications are contemplated which can be made without departing from the spirit of the described invention.

What is claimed is:

1. A process for preparing anhydropolyamino acid which comprises heating L-aspartic acid to a temperature above about 140° C. for a period of time sufficient to cause thermal condensation in the presence of a catalytically effective amount of a methylene phosphonic acid whereby the rate of said condensation is increased.

2. The process of claim 1 wherein the mole ratio of L-aspartic acid is aspartic acid to methylene phosphonic acid is from about 40:1 to 10:1.

3. The process of claim 2 further including the step of hydrolyzing the anhydropolyamino acid in alkaline solution to produce polyamino acid or salt thereof.

4. The process of claim 1 wherein the methylenephosphonic acid is 1-hydroxyethylidene-1,1-diphosphonic acid.

5. The process claim 1 wherein the methylenephosphonic acid is aminotris(methylenephosphonic acid).

6. The process of claim 1 wherein the mole ratio of L-aspartic acid to methylenephosphonic acid is in the range of from about 1:1 to about 40:1.

7. The process of claim 6 wherein the ratio is about 10:1.

8. The process of claim 6 wherein the mole ratio of L-aspartic acid to methylenephosphonic acid is 40:1.

9. The process of claim 1 wherein the methylenephosphonic acid is selected from the group consisting of aminotris(methylenephosphonic acid), ethylenediaminetetra(methylenephosphonic acid), hexamethylenediaminetetra(methylenephosphonic acid and diethylenetriaminepenta(methylenephosphonic acid) and mixtures thereof.

10. The process of claim 1 wherein the L-aspartic acid is heated in a tray drier.

11. The process of claim 10 wherein the tray drier is a rotary tray drier.

12. The process of claim 10 wherein the tray drier is an indirectly heated tray drier.

13. The process of claim 1 wherein the L-aspartic acid is heated in a rotary drier.

* * * * *